United States Patent
Beierl et al.

(10) Patent No.: US 7,597,379 B2
(45) Date of Patent: Oct. 6, 2009

(54) TOP FOR A CONVERTIBLE

(75) Inventors: Dominik Beierl, Korntal-Münchingen (DE); Harald Biersack, Gerlingen (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 11/852,482

(22) Filed: Sep. 10, 2007

(65) Prior Publication Data

US 2008/0061586 A1  Mar. 13, 2008

(30) Foreign Application Priority Data

Sep. 8, 2006 (DE) ....................... 10 2006 042 293

(51) Int. Cl.
*B60J 7/00* (2006.01)
(52) U.S. Cl. .................... 296/107.07; 296/107.17
(58) Field of Classification Search ........... 296/107.07, 296/146.14, 107.17, 147, 108
See application file for complete search history.

(56) References Cited

U.S. PATENT DOCUMENTS

| | | | | |
|---|---|---|---|---|
| 4,729,592 A * | 3/1988 | Tuchiya et al. | ......... | 296/107.04 |
| 4,893,868 A * | 1/1990 | Miller et al. | ................. | 296/219 |
| 5,988,729 A * | 11/1999 | Klein | ..................... | 296/107.07 |
| 6,033,012 A * | 3/2000 | Russke et al. | .......... | 296/107.17 |
| 6,139,087 A * | 10/2000 | Wolfmaier et al. | ..... | 296/107.16 |
| 6,213,536 B1 * | 4/2001 | Raisch et al. | .......... | 296/107.04 |
| 6,336,673 B1 * | 1/2002 | Rothe et al. | ............ | 296/107.17 |
| 6,447,050 B1 * | 9/2002 | Plassmeyer et al. | .... | 296/107.09 |
| 6,474,731 B2 * | 11/2002 | De Gaillard | ........... | 296/146.14 |
| 6,511,118 B2 * | 1/2003 | Liedmeyer et al. | ..... | 296/107.17 |
| 6,536,831 B2 * | 3/2003 | Rothe et al. | ............ | 296/107.07 |
| 6,592,169 B2 * | 7/2003 | Obendiek | .............. | 296/107.07 |
| 6,637,802 B2 * | 10/2003 | Obendiek | .................... | 296/108 |
| 6,715,823 B2 * | 4/2004 | Schmitt et al. | ......... | 296/107.09 |
| 6,767,044 B2 * | 7/2004 | Tohda et al. | ........... | 296/107.01 |
| 6,767,045 B2 * | 7/2004 | Reinsch | .................. | 296/107.17 |
| 6,866,322 B2 * | 3/2005 | Willard | .................. | 296/107.07 |
| 6,871,900 B2 * | 3/2005 | Pfertner et al. | ......... | 296/107.12 |
| 7,100,962 B2 * | 9/2006 | Schartner et al. | ....... | 296/107.09 |
| 7,118,161 B2 * | 10/2006 | Neubrand | ............... | 296/107.17 |
| 7,156,445 B2 * | 1/2007 | Taira et al. | ............. | 296/107.04 |
| 7,255,385 B2 * | 8/2007 | Queveau et al. | ........ | 296/107.08 |
| 7,374,235 B2 * | 5/2008 | Queveau et al. | ........ | 296/107.18 |
| 7,377,574 B2 * | 5/2008 | Richter et al. | .......... | 296/107.15 |
| 7,422,266 B2 * | 9/2008 | Schonhorst et al. | .... | 296/107.12 |
| 7,445,266 B2 * | 11/2008 | Liedmeyer et al. | ..... | 296/107.12 |

(Continued)

FOREIGN PATENT DOCUMENTS

DE 34 16 286 A1 10/1984

(Continued)

OTHER PUBLICATIONS

European Search Report dated Mar. 11, 2009.

*Primary Examiner*—Kiran B. Patel

(57) ABSTRACT

A collapsible top for a convertible can be stowed in a rear region of the convertible. The top has a rear window frame and at least one roof section which, in the closed state of the top, is situated in front thereof in the direction of travel. At least one roof section and/or the rear window frame is/are each designed as a frame-like module carrier to which different sheet-like roof modules can be fitted in order to implement different roof variants.

6 Claims, 2 Drawing Sheets

U.S. PATENT DOCUMENTS

| | | | |
|---|---|---|---|
| 2002/0074822 A1* | 6/2002 | Rothe et al. | 296/107.07 |
| 2002/0135200 A1* | 9/2002 | De Gaillard | 296/107.01 |
| 2003/0047961 A1* | 3/2003 | Nania | 296/107.08 |
| 2005/0140164 A1* | 6/2005 | Wilms et al. | 296/107.18 |
| 2005/0280291 A1* | 12/2005 | Storc et al. | 296/219 |
| 2006/0131922 A1* | 6/2006 | Russke | 296/108 |
| 2007/0152467 A1* | 7/2007 | Heselhaus et al. | 296/107.01 |
| 2007/0194593 A1* | 8/2007 | Heselhaus | 296/107.01 |
| 2007/0200385 A1* | 8/2007 | Roesler | 296/107.09 |
| 2007/0200386 A1* | 8/2007 | Halbweiss et al. | 296/108 |
| 2007/0210610 A1* | 9/2007 | Bunsmann et al. | 296/107.18 |
| 2008/0231070 A1* | 9/2008 | Sansome | 296/107.15 |

FOREIGN PATENT DOCUMENTS

| | | |
|---|---|---|
| DE | 3416286 A1 | 10/1984 |
| DE | 101 47 016 A1 | 4/2003 |
| DE | 10147016 A1 | 4/2003 |
| EP | 1 810 858 A2 | 7/2007 |
| EP | 1810858 A2 | 7/2007 |

* cited by examiner

TOP FOR A CONVERTIBLE

CROSS-REFERENCE TO RELATED APPLICATION

This application claims the priority, under 35 U.S.C. §119, of German application DE 10 2006 042 293.7, filed Sep. 8, 2006; the prior application is herewith incorporated by reference in its entirety.

BACKGROUND OF THE INVENTION

Field of the Invention

The present invention relates to a top for a convertible, which can be stowed in a rear region of the convertible and which has a rear window frame. In the closed state, at least one roof section is disposed in front of the rear window frame, in the direction of travel.

Convertibles usually have openable roofs, generally "hard tops" or "soft tops". However, in particular tops designed as soft tops make a bad impression because of a high background noise in the convertible interior.

German patent DE 102 05 935 B4 discloses a vehicle roof structure which is mounted movably on a convertible and can be displaced between a closed position over the passenger compartment and an open position in the roof storage space of the vehicle. The vehicle roof structure has in this case a front, a central and a rear section, the front and the rear sections being designed as fixed roof parts and the vehicle roof structure forming a hard top roof by addition of a fixed-shell, central roof part as the central section, or a folding top by addition of a flexible roof part covering at least the central section. In order to be able to realize the different roof variants, the central, fixed roof part and the flexible roof part for the central section are fastened releasably in the form of exchangeable parts to the vehicle roof structure.

BRIEF SUMMARY OF THE INVENTION

It is accordingly an object of the invention to provide a top for a convertible which overcomes the above-mentioned disadvantages of the heretofore-known devices and methods of this general type and which provides for an improved implementation and increases the driving comfort of the convertible.

With the foregoing and other objects in view there is provided, in accordance with the invention, a top for a convertible, comprising:

a rear window frame and one or more roof sections disposed in front of the rear window frame, in a direction of forward travel of the convertible, when the top is closed;

the rear window frame and the one or more roof sections together defining a convertible top that can be put away in a rear of the convertible;

at least one of the roof sections and/or the rear window frame forming a frame-shaped module carrier configured to receive different sheet-like roof modules for implementing realize different roof variants for the convertible.

In a preferred embodiment, the top has a total of three roof sections and the rear window frame, the roof sections including a frontmost roof section, in the direction of travel, formed as an integral roof frame and two roof sections disposed behind the frontmost roof section formed as first and second surface bows.

The invention is based on the general concept of designing a top of a convertible in a modular construction, with use being made of a top linkage which is always the same and of module carrier sections which are always the same, which can be fitted with different sheet-like roof modules depending on the desired roof variant. The top is put away in a customary manner in a rear region of the convertible and has a rear window frame and, in the closed state, at least one roof section situated in front thereof in the direction of travel. The roof sections and/or the rear window frame are designed in each case as frame-like module carriers and can be equipped with different sheet-like roof modules in order to realize different roof variants. The modular construction according to the invention makes it possible to realize widely differing roof variants using a high number of identical parts, namely the top linkage, the rear window frame and the roof sections, by different roof modules being arranged for this purpose on the abovementioned roof components. For example, an at least partially transparent panorama roof or a closed, non-transparent roof can be realized merely by fitting transparent or non-transparent roof modules, thus achieving a cost-effective modular system which, however, permits a high degree of flexibility during manufacturing.

A flexible covering is expediently provided which, when the top is closed, covers all of the roof sections and the rear window frame in a region surrounding the rear window. By this means, a top variant similar to a soft top can be provided, the preferably water-repelling covering protecting against external weather influences. By this means, the advantages of a "hard top", namely a significantly improved noise background in the interior of the convertible, can be achieved with the top according to the invention which, in terms of its structure, corresponds to that of a reinforced soft top.

In an advantageous development of the solution according to the invention, in order to realize a panorama roof variant, when the top is closed the covering covers only the top linkage while transparent roof modules are fitted to the roof sections and in the rear window frame. By this means, the open driving sensation, which is known for convertibles and is highly prized, can be realized, even when the top is closed, but with it being possible to provide protection against external weather influences. In addition, the use of tinted or, for example, self-tinting roof modules makes it possible to reduce direct solar radiation loading, thus enabling the driving comfort of the convertible according to the invention to be enhanced.

Other features which are considered as characteristic for the invention are set forth in the appended claims.

It will be readily understood that the features mentioned above and those which have yet to be explained below can be used not only in the respectively stated combination but also in different combinations or on their own without departing from the scope of the present invention.

Preferred exemplary embodiments of the invention are illustrated in the drawings and are explained in more detail in the description below, with the same reference numbers referring to identical or similar or functionally identical components. Further, although invention is illustrated and described herein as embodied in top for a convertible, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
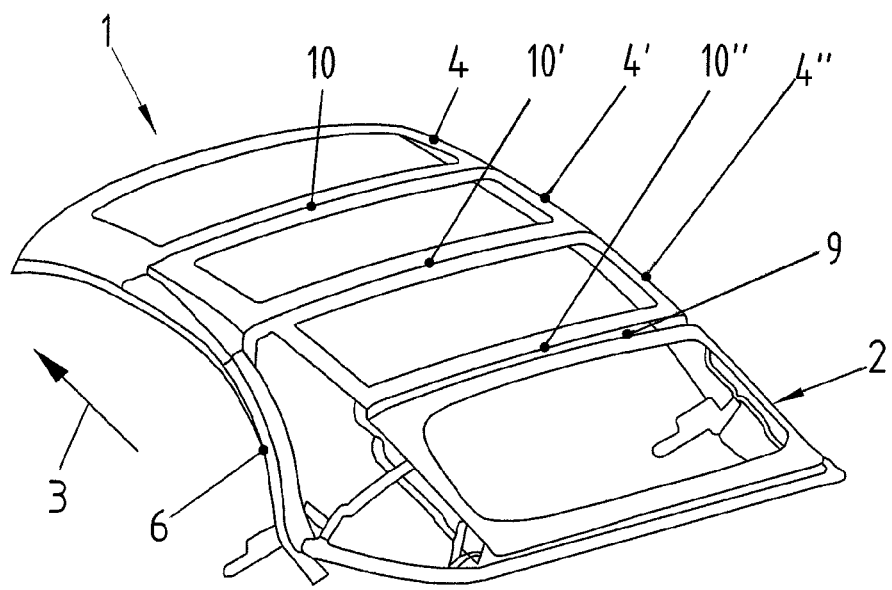
FIG. 1 is a perspective view of frame-like module carriers of a top according to the invention of a convertible.

Referring now to the figures of the drawing in detail and first, particularly, to FIG. 1 thereof, there is shown a top 1, which can be opened, of a convertible (otherwise not shown). The top can be put away, i.e., stowed, in a rear region of the convertible, in particular into a top compartment. The top 1 has a rear window frame 2 and, in the closed state, at least one roof section 4, 4', 4" situated in front thereof in the direction of travel 3. In the open state, the roof sections 4 and 4' lie above the rear window frame 2 while, when the top 1 is put away, the roof section 4" is arranged below the rear window frame 2.

According to FIG. 1, the top 1 described overall above has three roof sections 4, 4', 4" and the rear window frame 2, the frontmost roof section 4 in the direction of travel 3 being designed as an integral roof frame and the roof section 4' situated directly behind it being designed as the first surface bow or arch. The roof section 4" arranged between the first surface bow (or arch) 4' and the rear window frame 2 is designed as a second surface bow (or arch).

Figure 2:
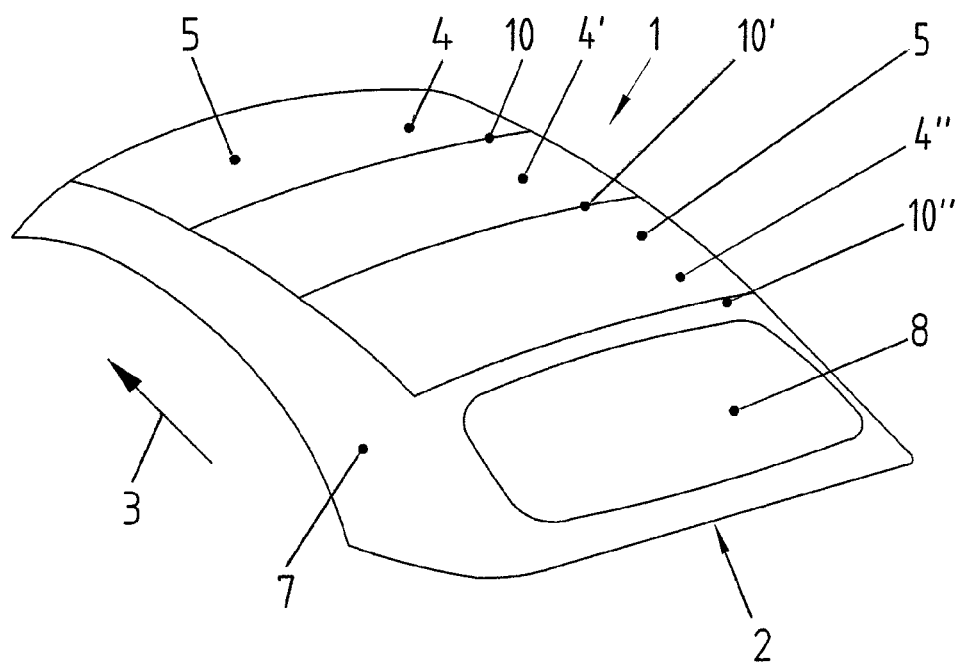
FIG. 2 is a left rear top perspective view, similar to FIG. 1, but with roof modules fitted and a covering installed.

In order to realize different roof variants, it is now provided that at least one roof section 4, 4', 4" and/or the rear window frame 2 is/are each designed as a frame-like module carrier to which different sheet-like modules 5 can be fitted (cf. FIG. 2).

The roof modules 5 can be designed, for example, to be entirely or at least partially transparent, with a design of clear or tinted laminated safety glass also being conceivable. For example, a panorama roof can be produced with roof modules 5 of this type. Furthermore, it is conceivable that at least one roof module 5 is formed from light metal or from plastic, i.e. is nontransparent, and is additionally kept, for example, in the color of the convertible (not shown). In this case, the different roof modules 5 can be inserted into or fitted to the associated roof sections 4, 4', 4" or the associated rear window frame 2 in any desired manner.

In general, the roof sections 4, 4', 4", which are designed as module carriers, and the rear window frame 2 are arranged, at least when the top 1 is closed, between a lateral top linkage 6 which forms a lateral roof frame. In all of the variants, at least this top linkage 6 is covered by a flexible covering 7 which is known from conventional soft tops and, by means of its water-repelling action, protects the convertible interior from external weather influences. In general, it can be provided in this case that the flexible covering 7 either covers all of the roof sections 4, 4', 4" and the rear window frame 2 in a region surrounding a rear window 8 when the top 1 is closed, or else, in order to realize the panorama roof variant, the cover 7 only covers the top linkage 6, when the top 1 is closed, while transparent roof modules 5 are fitted to the roof sections 4, 4', 4" and to the rear window frame 2.

FIG. 2 shows a roof variant in which the flexible covering 7 covers the lateral top linkage 6 and the rear window frame 2 in the region surrounding the rear window 8. The individual roof modules 5, which can be formed, for example, from light metal and/or from plastic and, in particular, have the same paintwork as the convertible, are arranged in the roof sections 4, 4', 4" between the lateral covering 7. It is also conceivable however, that at least one of the roof modules 5, according to FIG. 2, is designed as a transparent roof module 5.

Figure 3:
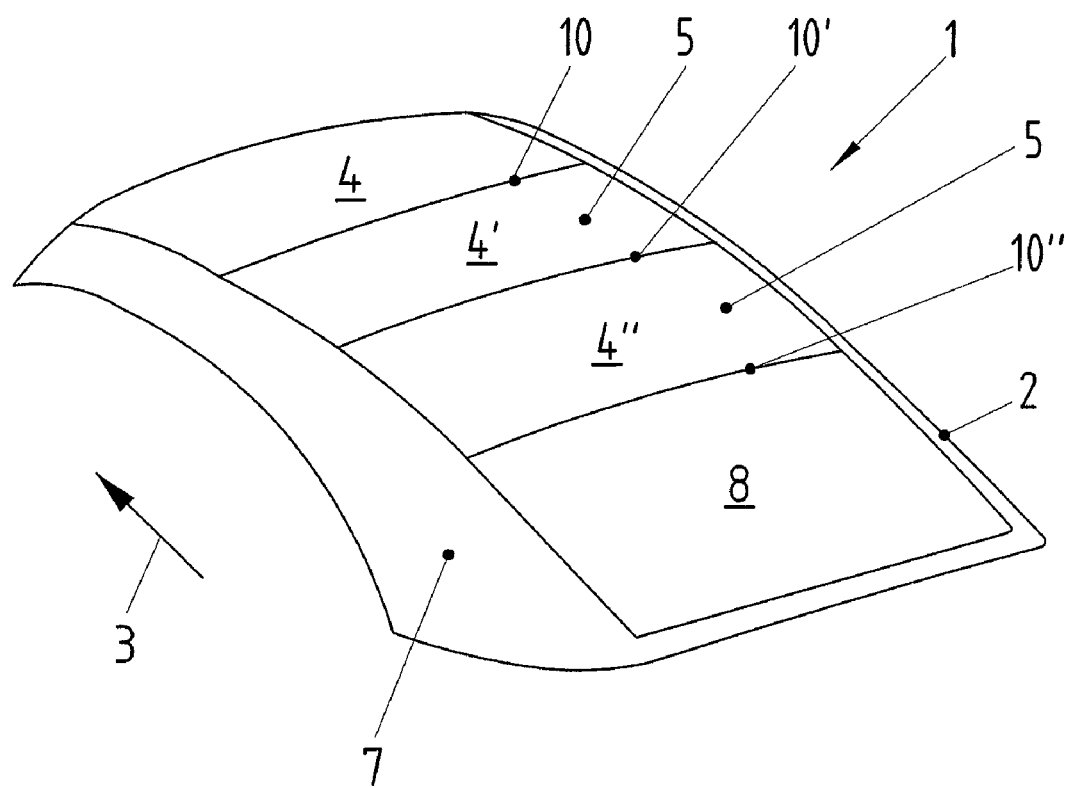
FIG. 3 is a view similar to the illustration of FIG. 2, but with different roof modules.

The panorama roof variant is realized in FIG. 3, in which, as mentioned above, when the top 1 is closed the covering 7 only covers the top linkage 6 while transparent roof modules 5 are arranged on the roof sections 4, 4', 4" and on the rear window frame 2. In the case of this panorama roof variant, a transparent roof module 5 which is larger than a rear window 8 is arranged on the rear window frame 2, as a result of which the large transparent roof module 5, which is already used in each case in the front roof sections 4, 4', 4", is also found again in the rear window frame 2 and, as a result, improves the overall visual impression of the panorama roof.

In the case of a covering 7 passing over all of the roof sections 4, 4', 4" and the rear window frame 2, said covering takes over the weather protection, with it being possible, in this variant and in the top designed as a panorama roof, for a respective seal 9 to be arranged between two adjacent roof sections 4, 4' and/or between the rear window frame 2 and its adjacent roof section 4", which seal is designed, in particular, as an acoustic seal and protects the convertible interior in terms of sound. A seal 9 of this type can be implemented, for example, by way of a microfiber fleece which, according to a special embodiment, can be sewn into a tube. The seal 9 therefore provides a seal, at least in terms of sound, for the joints 10, 10', 10" between the individual roof sections 4, 4', 4" and between the roof section 4" and the rear window frame 2.

The invention claimed is:

1. A top for a convertible, comprising:
    a rear window frame and one or more roof sections disposed in front of said rear window frame, in a direction of forward travel of the convertible, when the top is closed;
    said rear window frame and said one or more roof sections together defining a convertible top;
    at least one of said roof sections and/or said rear window frame configured to receive different sheet-shaped roof modules for implementing different roof variants for the convertible; and
    a top linkage interconnecting said roof sections when the top is closed; and
    a flexible covering at least partially covering said top linkage when transparent roof modules are fitted to said roof sections and to said rear window frame in a panorama roof variant configuration.

2. The top according to claim 1, which comprises a total of three roof sections and said rear window frame, said roof sections including a frontmost roof section, in the direction of travel, formed as an integral roof frame and two roof sections disposed behind said frontmost roof section formed as first and second surface bows.

3. The top according to claim 1, wherein at least one roof module is formed from clear or tinted laminated safety glass or plastic.

4. The top according to claim 1, wherein a transparent roof module that is larger than said rear window frame.

5. The top according to claim 1, which comprises:
    an acoustic seal is disposed between mutually adjacent roof sections and/or between said rear window frame and an adjacent said roof section.

6. The top according to claim 1, wherein, when the top is closed, said top linkage forms lateral roof frames having said one or more roof sections and said rear window frame disposed therebetween.

* * * * *